(12) United States Patent
Yokose

(10) Patent No.: US 8,433,151 B2
(45) Date of Patent: Apr. 30, 2013

(54) IMAGE CODING APPARATUS, IMAGE CODING METHOD AND COMPUTER READABLE MEDIUM STORING PROGRAM

(75) Inventor: Taro Yokose, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 403 days.

(21) Appl. No.: 12/659,623

(22) Filed: Mar. 15, 2010

(65) Prior Publication Data

US 2011/0013831 A1   Jan. 20, 2011

(30) Foreign Application Priority Data

Jul. 15, 2009   (JP) ................. 2009-166428

(51) Int. Cl.
*G06K 9/00* (2006.01)
(52) U.S. Cl.
USPC .......................................... 382/251; 382/250
(58) Field of Classification Search .................. 382/250, 382/251, 276
See application file for complete search history.

(56) References Cited

U.S. PATENT DOCUMENTS

| | | | | |
|---|---|---|---|---|
| 5,570,203 | A * | 10/1996 | Suzuki et al. | 382/250 |
| 5,577,132 | A * | 11/1996 | Yokose et al. | 382/238 |
| 5,930,398 | A | 7/1999 | Watney | |
| 7,567,722 | B2 | 7/2009 | Liu et al. | |
| 2008/0175503 | A1 * | 7/2008 | Bichlmaier et al. | 382/248 |
| 2009/0028454 | A1 * | 1/2009 | Yokose | 382/251 |

FOREIGN PATENT DOCUMENTS

| | | |
|---|---|---|
| JP | A-05-276391 | 10/1993 |
| JP | A-08-251420 | 9/1996 |
| JP | H05-153406 | 9/1996 |
| JP | A-2000-137820 | 5/2000 |
| JP | A-2007-243633 | 9/2007 |
| JP | A-2008-535322 | 8/2008 |
| JP | A-2009-027664 | 2/2009 |

OTHER PUBLICATIONS

Jan. 24, 2013 Office Action issued in Japanese Patent Application No. 2009-166428 (w/translation).

* cited by examiner

*Primary Examiner* — John Strege
(74) *Attorney, Agent, or Firm* — Oliff & Berridge, PLC

(57) ABSTRACT

An image coding apparatus includes: a transformation unit that transforms spatial domain image data having plural pixels, by a pixel block including plural pixels as a unit, into plural coefficient groups each including plural frequency domain coefficients; a grouping unit that classifies the plural coefficient groups into plural groups for classification of values in these coefficient groups; a quantization coefficient calculation unit that calculates a quantization coefficient used for quantizing plural coefficients included in the respective plural coefficient groups based on the number of coefficient groups classified in the plural groups and the values of the coefficient groups classified in the plural groups; a quantization unit that quantizes the respective plural coefficients included in the respective plural coefficient groups obtained by the transformation by using the calculated quantization coefficient; and a coding unit that encodes the plural coefficients included in the plural quantized coefficient groups to generate codes.

19 Claims, 11 Drawing Sheets

IMAGE COMPRESSION CODING PROGRAM 14

IMAGE CODING APPARATUS (HARDWARE CONFIGURATION) 1

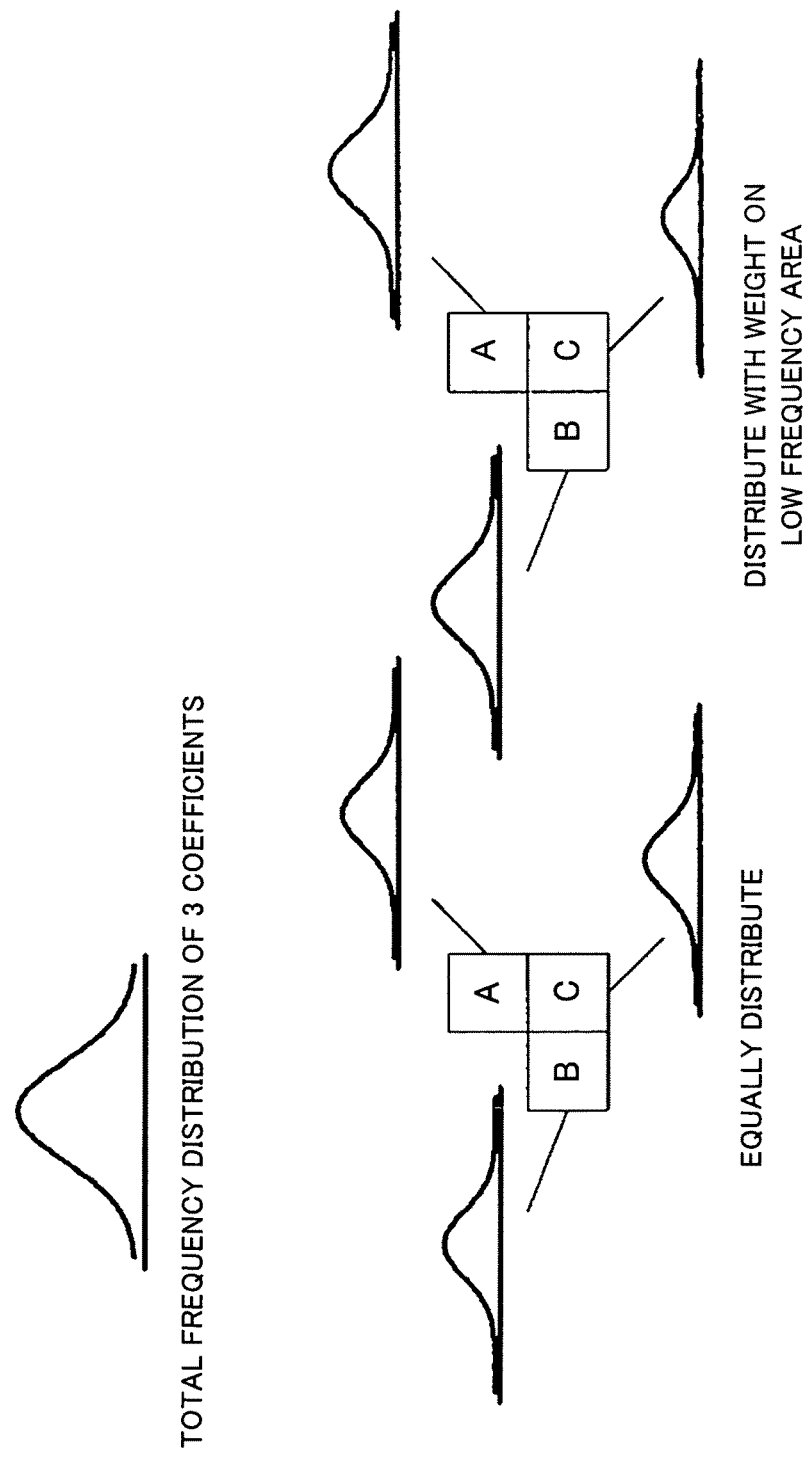

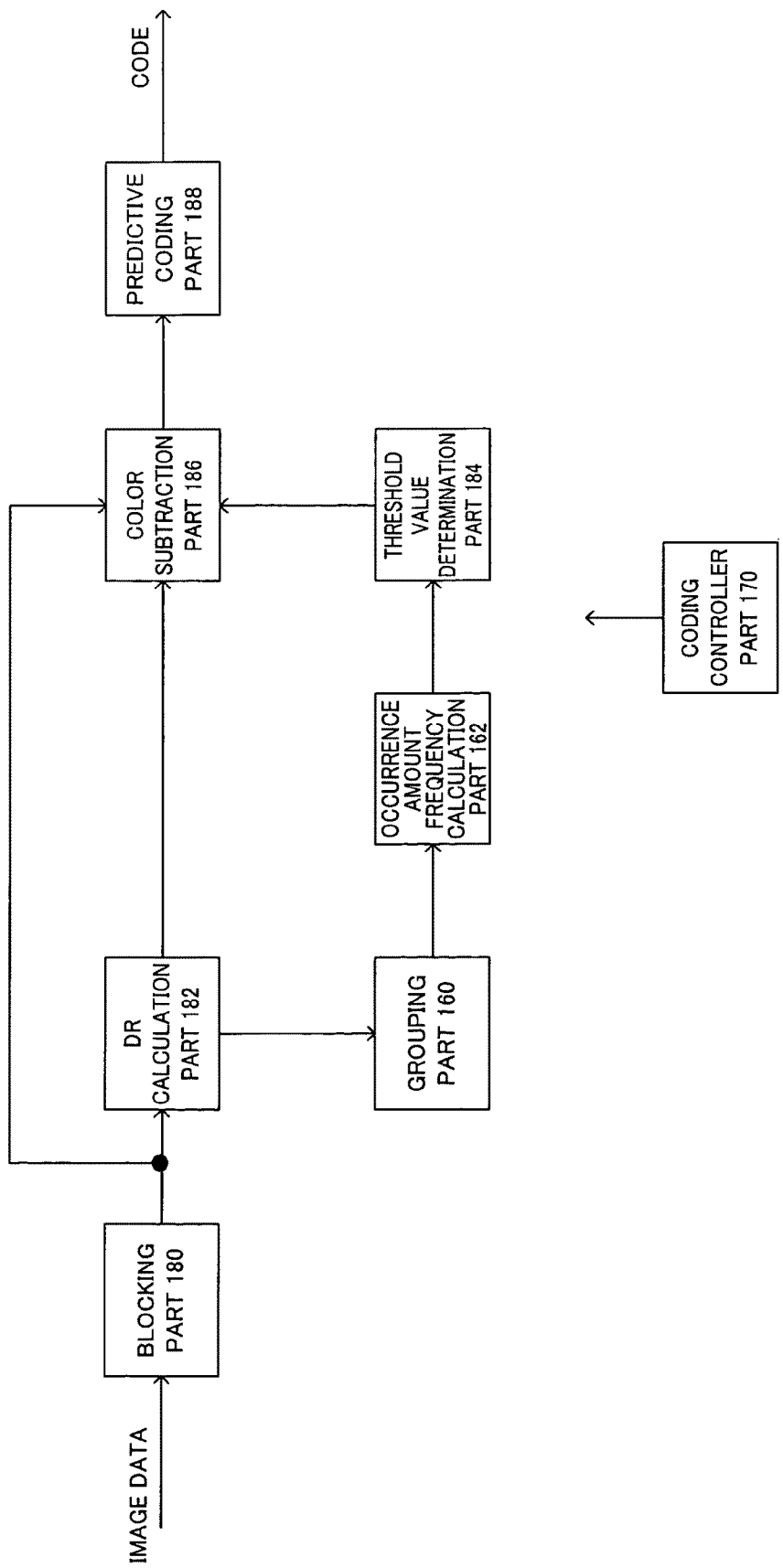

IMAGE CODING APPARATUS, IMAGE CODING METHOD AND COMPUTER READABLE MEDIUM STORING PROGRAM

CROSS-REFERENCE TO RELATED APPLICATIONS

This application is based on and claims priority under 35 USC 119 from Japanese Patent Application No. 2009-166428 filed Jul. 15, 2009.

BACKGROUND

Technical Field

The present invention relates to an image coding apparatus, image coding method and a computer readable medium storing a program.

SUMMARY

According to an aspect of the invention, there is provided an image coding apparatus including: a transformation unit that transforms spatial domain image data having plural pixels, by a pixel block including plural pixels as a unit, into plural coefficient groups each including plural frequency domain coefficients; a grouping unit that classifies the plural coefficient groups into plural groups for classification of values in these coefficient groups; a quantization coefficient calculation unit that calculates a quantization coefficient used for quantizing plural coefficients included in the respective plural coefficient groups based on the number of coefficient groups classified in the plural groups and the values of the coefficient groups classified in the plural groups; a quantization unit that quantizes the respective plural coefficients included in the respective plural coefficient groups obtained by the transformation by using the calculated quantization coefficient; and a coding unit that encodes the plural coefficients included in the plural quantized coefficient groups to generate codes.

BRIEF DESCRIPTION OF THE DRAWINGS

An exemplary embodiment of the present invention will be described in detail based on the following figures, wherein:

FIG. 6 is an explanatory view of a method for allocating a value obtained by counting three DCT coefficient values included in plural (three) DCT coefficient groups, as one value, to the respective three DCT coefficient values;

FIG. 8 is a block diagram showing a construction of a third image compression coding program;

DETAILED DESCRIPTION

[Prehistory of Present Exemplary Embodiment]

Prior to describing the present exemplary embodiment, the prehistory of the present exemplary embodiment will be described for assistance of understanding.

Note that the present exemplary embodiment can be realized with specialized hardware or software, or a combination of general hardware or software. Hereinbelow, however, for clarification and substantiation of the description, unless particularly noted, the present exemplary embodiment is realized with specialized software executed on a general computer by concretely utilizing its hardware resources.

[Hardware]

Figure 1:
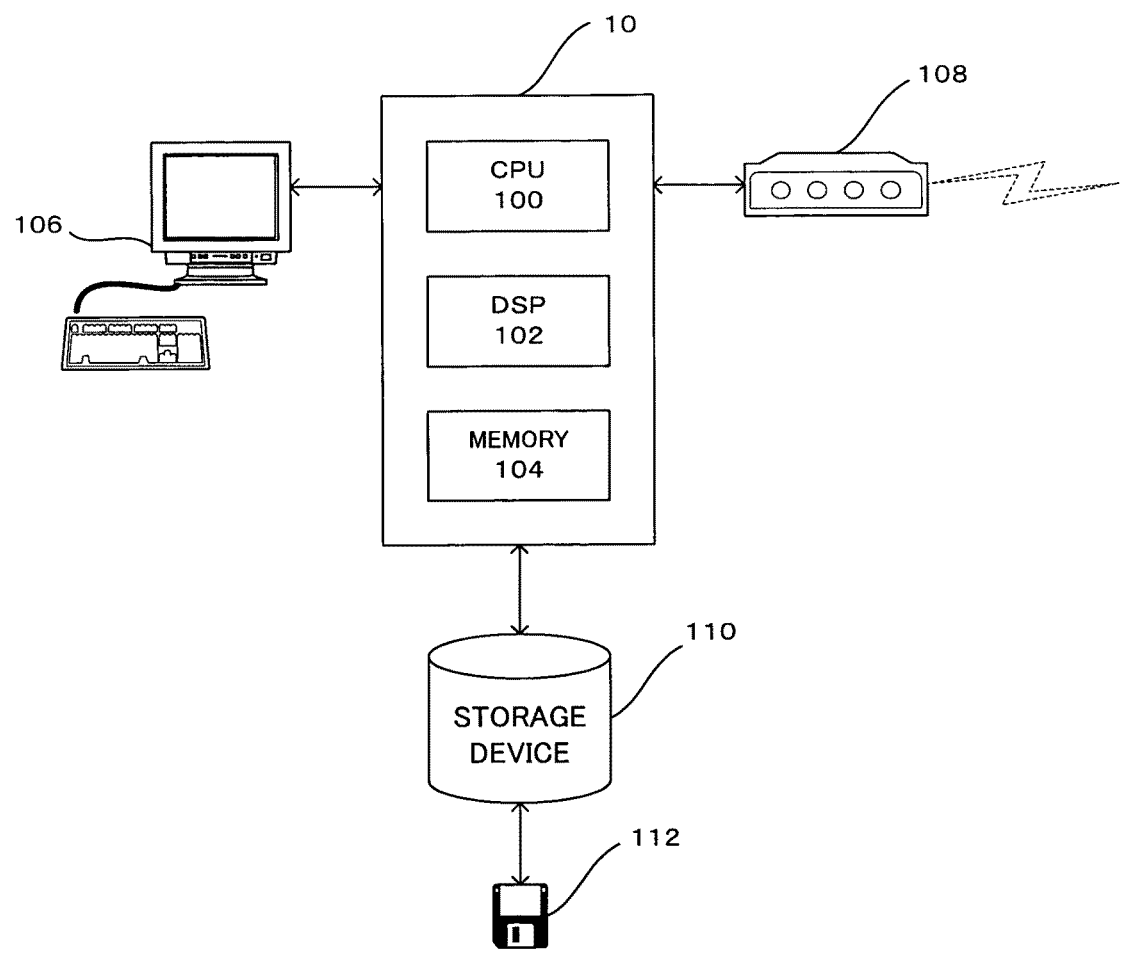
FIG. 1 illustrates a hardware configuration of an image compression apparatus used for realization of an exemplary embodiment.

FIG. 1 illustrates a hardware configuration of an image compression apparatus 1 used for realization of the present exemplary embodiment.

As shown in FIG. 1, the image compression apparatus 1 has a main body 10 including a CPU 100, a DSP (Digital Signal Processor) 102, a memory 104 and the like, an input/output device 106 including a display device, a mouse, a memory card receiving device (not shown) and the like, a communication device 108 to perform communication with another image processing apparatus 1 via a network, and a storage device 110 which is a CD device, a HD device, a DVD device or the like, to perform data writing/reading with respect to a storage medium 112.

That is, the image processing apparatus 1 has a constituent part as a general computer capable of signal processing.

[Software Configuration]

Figure 2:
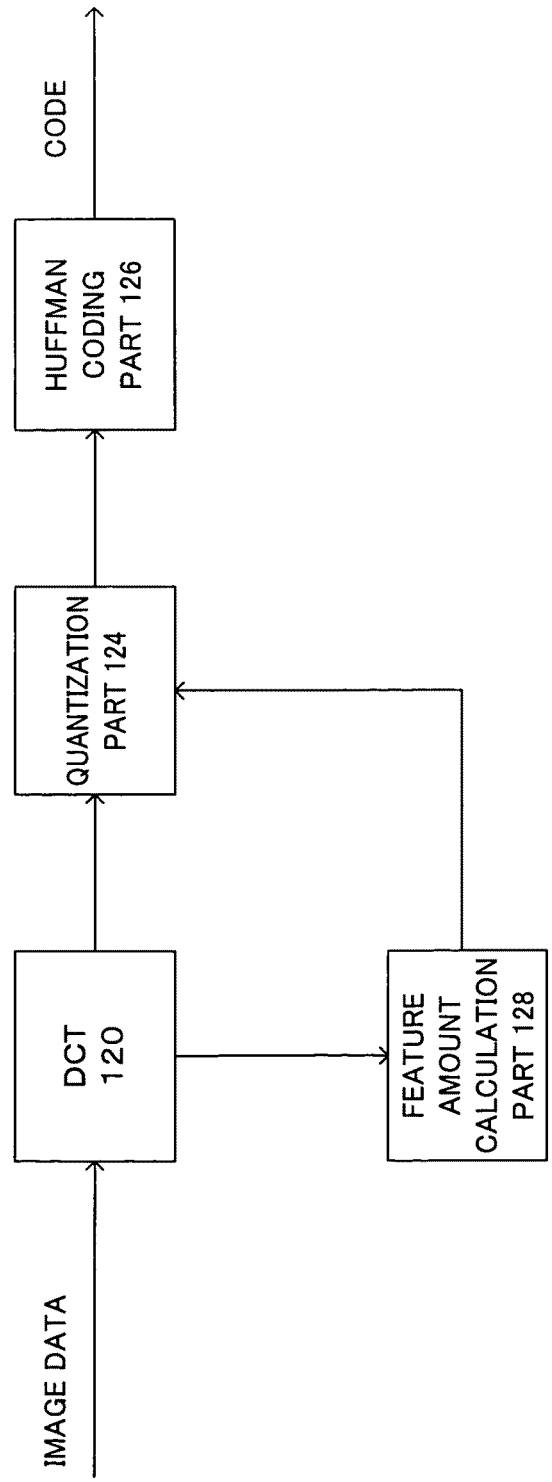
FIG. 2 is a block diagram showing a construction of a general image compression coding program.

FIG. 2 is a block diagram showing a construction of a general image compression coding program 12.

As shown in FIG. 2, the image compression coding program 12 has a DCT (Discrete Cosine Transform) part 120, a quantization part 124, a Huffman coding part 126 and a feature amount calculation part 128.

Note that hereinbelow, in the respective figures, substantially the same constituent elements will have the same reference numerals.

The image compression coding program 12 is supplied to the image compression apparatus 1 via e.g. the storage medium 112, loaded to the memory 104, and executed on an OS operating on the image compression apparatus 1 by concretely utilizing its hardware resources (hereinbelow the respective programs will be executed similarly).

The image compression coding program 12, with these constituent elements, converts spatial domain image data inputted from the outside via the communication device 108 (FIG. 1) or the like, to frequency domain coefficients, then quantizes and variable-length encodes them thereby compresses the data, and outputs the result of compression as codes via the communication device 108 or the like.

In the image compression coding program 12, the DCT part 120 performs DCT processing on the spatial domain image data by pixel block including e.g. 8×8 pixels as a unit.

Note that when image data includes plural color data pieces (RGB or the like), the DCT part 120 performs DCT processing by color data.

The DCT part 120 outputs a DCT coefficient group, including 8×8 frequency domain DCT coefficients obtained by the DCT processing from each pixel block, to the quantization part 124 and the feature amount calculation part 128.

The feature amount calculation part 128 generates a histogram indicating occurrence frequencies of the respective 8×8 DCT coefficients included in each DCT coefficient group inputted from the DCT part 120.

The feature amount calculation part 128 optimizes 8×8 quantization coefficients Q corresponding to the construction of the DCT coefficient group using the generated histogram so as to obtain a desired characteristic for a code obtained as a result of image compression coding by the image compression coding program 12, and outputs the optimized result to the quantization part 124.

The quantization part 124 quantizes the 8×8 DCT coefficients included in each DCT coefficient group using the respective 8×8 quantization coefficients Q inputted from the feature amount calculation part 128, and outputs the quantized result to the Huffman coding part 126.

The Huffman coding part 126 variable-length encodes the quantized DCT coefficient group inputted from the quantization part 124, and outputs the coded result as a code.

[Points to be Improved in General Image Compression Coding Program]

As described above, the feature amount calculation part 128 of the image compression coding program 12 generates a histogram from the values of all the DCT coefficients.

Accordingly, assuming that the dynamic range of the histogram is 256, the DCT part 120 needs a memory having 49152 (=8×8×3 colors×256) entries so as to output all the DCT coefficients (entries) included in one DCT coefficient group obtained from a pixel block included in RGB color image data to the feature amount calculation part 128.

Further, heavy load is applied to interface processing (entry) to deliver all the DCT coefficients stored in these entries to the feature amount calculation part 128.

Further, when the image compression coding program 12 is realized not with software but specialized hardware, 49152 registers are required for the above-described reason, and when the functions of the image compression coding program 12 are realized with the hardware, the hardware scale is increased due to the large number of the registers.

[Principle of the Present Exemplary Embodiment]

In the present exemplary embodiment, to avoid the above-described points to be improved in the general image compression coding program 12, for example, as described above, the histograms of the DCT coefficients from RGB color image data are integrated, by plural histograms, into one histogram, thereby the number of histograms is reduced.

The memory capacity required for processing is reduced by the reduction of the number of histograms, and the amount of hardware in realization with hardware is reduced.

The value indicated with the histogram deleted by the integration, when necessary, can be obtained by interpolation of the integrated histogram.

Further, when the number of DCT coefficients to be stored for processing is reduced or the DCT coefficient values are reduced, the memory capacity for storage of DCT coefficients can be reduced.

The integration of histograms and reduction of the number of memory entries are performed as shown in the following steps (1) to (3).

Figure 3:
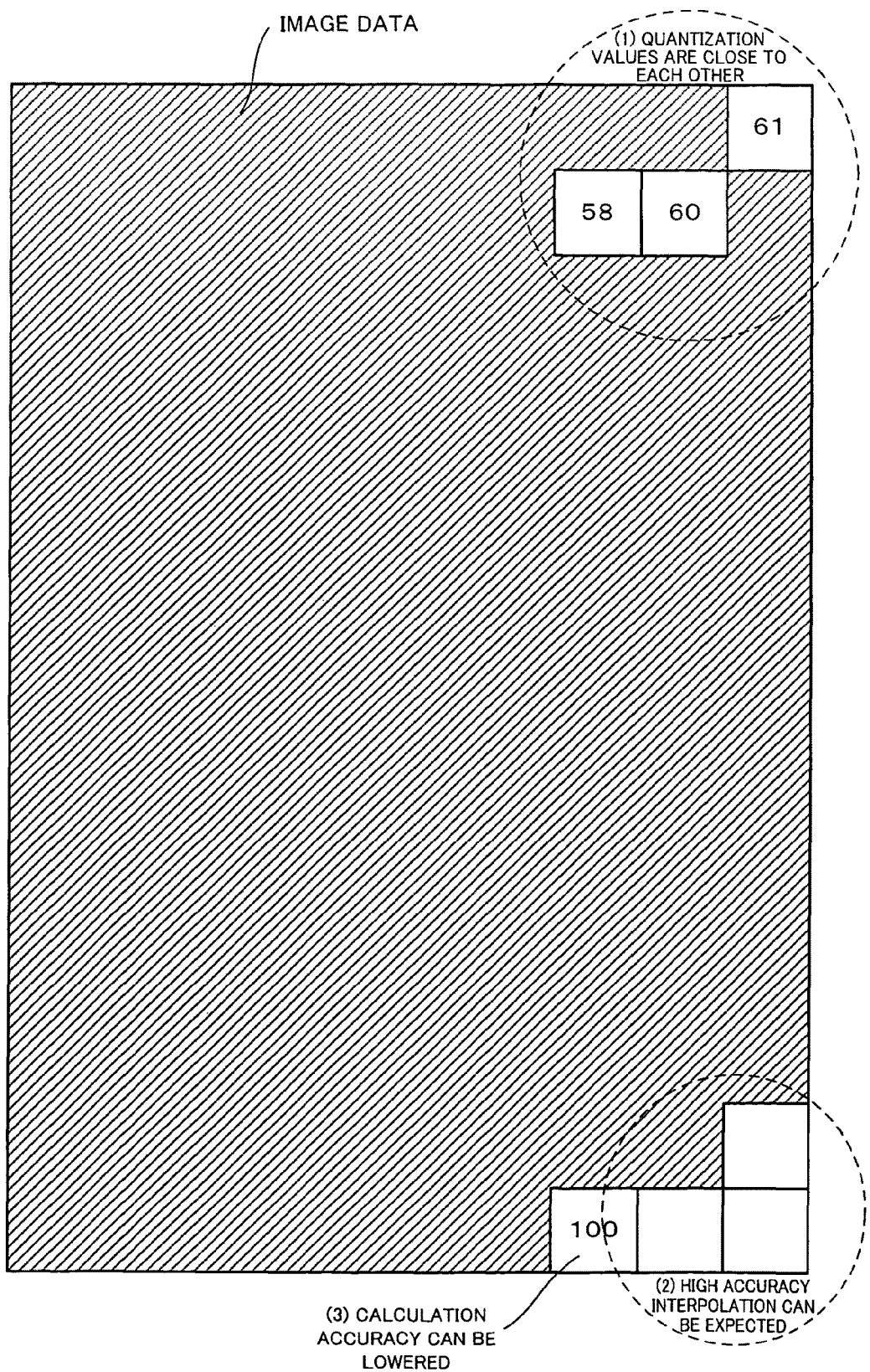
FIG. 3 is an explanatory view of integration of histograms and reduction of the number of memory entries according to the exemplary embodiment.

FIG. 3 is an explanatory view of the integration of histograms and reduction of the number of memory entries according to the present exemplary embodiment.

(1) For example, in some cases, the DCT coefficient groups obtained from several pixel blocks are the same or approximate, and the DCT coefficients included in these DCT coefficient groups are quantized using the same value quantization coefficient Q (see FIG. 3(1)).

In this manner, since the DCT coefficients included in plural DCT coefficient groups to be quantized using the same value quantization coefficient Q, when counted in one integrated histogram, have little influence on the contents of the quantization coefficients Q generated by the feature amount calculation part 128, these histograms can be integrated.

(2) When the DCT coefficients are represented as an 8×8 block corresponding to the pixel block, generally, the histograms of two DCT coefficients positioned symmetrically with a diagonal component therebetween have approximate characteristics.

By utilizing this feature, buffering is performed on only one of the two DCT coefficients in symmetrical positions with a diagonal component therebetween and the other DCT coefficient is interpolated as the same value, thereby the number of memory entries can be reduced (see FIG. 3 (2)).

Further, statistically, the frequency of approximation between DCT coefficient values in particular positions is high. Accordingly, buffering is performed on only one of two DCT coefficients having statistically approximate values and the other DCT coefficient is interpolated as the same value, thereby the number of memory entries can be reduced.

(3) For example, in JPEG coding, an initial value of the quantization coefficient Q is multiplied by a numerical value called a scaling factor, thereby the quantization coefficient Q is regulated.

Generally, since the scaling factor is discretely determined by 1/50, in this case, for example, the value of the quantization coefficient Q having its initial value 100 is changed by 2 (FIG. 3(3)).

Accordingly, in this case, for example, whether the value of the DCT coefficient is 0 or 1, a value obtained by dividing by the quantization coefficient 2 is 0. Since it is not necessary to perform counting with discrimination of occurrence frequencies between the DCT coefficient values 0 and 1, the histograms can be integrated.

Further, similar processing is performed on the respective 8×8 quantization coefficients.

For example, the value of another quantization coefficient having its initial value 101 is changed by 2.02.

Since the quantization coefficient is an integer value, when rounded (or rounded off) after the decimal point, the value of the quantization coefficient is changed to 2, 4, 6, . . . , 48, 51, 53, . . . , and in the middle, changed to a value different from that of the quantization coefficient having its initial value 100.

However, as in the case of the quantization coefficient having its initial value 100, since an integer value which is not a value of the quantization coefficient exists, even when the initial value of the quantization coefficient is 101, the histograms can be integrated.

In this manner, when the DCT coefficient is divided by the initial value of the quantization coefficient Q and a value corresponding to the change of the scaling factor, the histograms can be integrated, and the number of bits of memory entries can be reduced. Accordingly, the memory capacity necessary for processing can be reduced.

[First Image Compression Coding Program 14]

Hereinbelow, a first image compression coding program 14 will be described.

Figure 4:
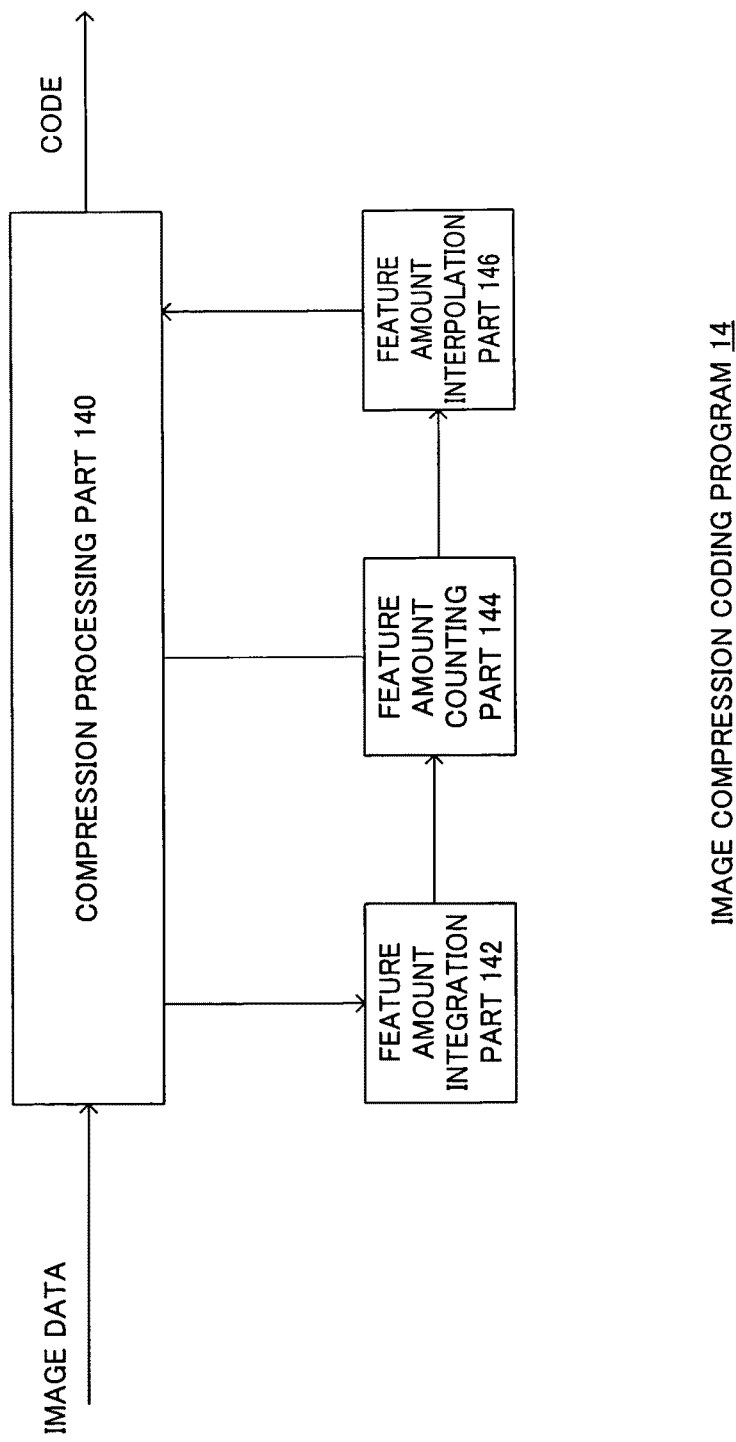
FIG. 4 is a block diagram showing a configuration of a first image compression coding program.

FIG. 4 is a block diagram showing a configuration of the first image compression coding program 14.

As shown in FIG. 4, the image compression coding program 14 has a compression processing part 140, a feature amount integration part 142, a feature amount counting part 144 and a feature amount interpolation part 146.

The image compression coding program 14, with these constituent elements, regulates the quantization coefficient Q in correspondence with the value of a numerical value (dynamic range) indicating the range of a DCT coefficient included in a DCT coefficient group and the result of comparison with a threshold value, thereby performs image compression coding.

In the image compression coding program 14, the compression processing part 140 compression-encodes image data by e.g. the JPEG method.

The feature amount integration part 142 receives respective pixel values of a pixel block or a DCT coefficient group from the compression processing part 140, and determines the dynamic range of the pixel included in the pixel block or the dynamic range of the DCT coefficient as a feature amount.

Further, the feature amount integration part 142 performs grouping on the respective feature amounts into plural groups for classification of feature amounts respectively having values in predetermined ranges, and outputs the groups of the feature amounts to the feature amount counting part 144.

Note that the grouping of the feature amounts by the feature amount integration part 142 is performed based on, e.g. the fact that pixel blocks or DCT coefficient groups showing close dynamic ranges generally appear at about the same frequencies.

Otherwise, the feature amount integration part 142 performs grouping, in correspondence with e.g. a threshold value used for regulation of the quantization coefficient Q, such that pixel blocks or DCT coefficient groups showing dynamic ranges to cause the same quantization coefficient Q are included in the same group.

The feature amount counting part 144 counts the number of feature amounts divided in the plural groups, generates a histogram showing the number of these numbers, and outputs the result of counting to the feature amount interpolation part 146.

The feature amount interpolation part 146 interpolates the inputted histogram by interpolating the number of feature amounts indicating the respective plural numerical values included in the group, from the histogram inputted from the feature amount counting part 144, in accordance with necessity.

The feature amount interpolation part 146 outputs the histogram inputted from the feature amount counting part 144 or the interpolated histogram to the compression processing part 140.

The compression processing part 140 receives the histogram from the feature amount counting part 144, regulates the quantization coefficient Q based on the distribution (frequency distribution) of the number of feature amounts indicated with the received histogram, and performs predictive coding using the regulated quantization coefficient Q in quantization processing.

The regulation of the quantization coefficient Q is performed based on a general characteristic that there is correlation between the number of DCT coefficients when the number of feature amounts indicated with the histogram is equal to or greater than the value of the quantization coefficient Q, i.e., the quantization values are other than 0 (non-zero values), and the JPEG code amount.

More particularly, for example, the compression processing part 140 obtains the number of non-zero DCT coefficients corresponding to a predetermined desired code amount, based on the above-described general characteristic, and regulates the quantization coefficient Q such that the number of non-zero DCT coefficients is the obtained number.

[Entire Operation of Second Image Compression Coding Program 14]

Hereinbelow, the entire operation of the second image compression coding program 14 will be described.

In the image compression coding program 14, the compression processing part 140 compression-encodes image data.

The feature amount integration part 142 performs grouping on the respective feature amounts from the respective DCT coefficient groups, into plural groups for classification of feature amounts which are DCT coefficients having values in predetermined ranges.

The feature amount counting part 144 counts the number of feature amounts divided in the plural groups, and generates a histogram indicating these numbers.

The feature amount interpolation part 146 interpolates the inputted histogram by interpolating the number of feature amounts indicating the respective plural numerical values included in the group in accordance with necessity, from the histogram inputted from the feature amount counting part 144.

The compression processing part 140 regulates the quantization coefficient Q based on the frequency distribution of the feature amounts indicated with the received histogram, and performs predictive coding using the regulated quantization coefficient Q in quantization processing.

[Second Image Compression Coding Program 16]

Hereinbelow, a second image compression coding program 16 will be described.

Figure 5:
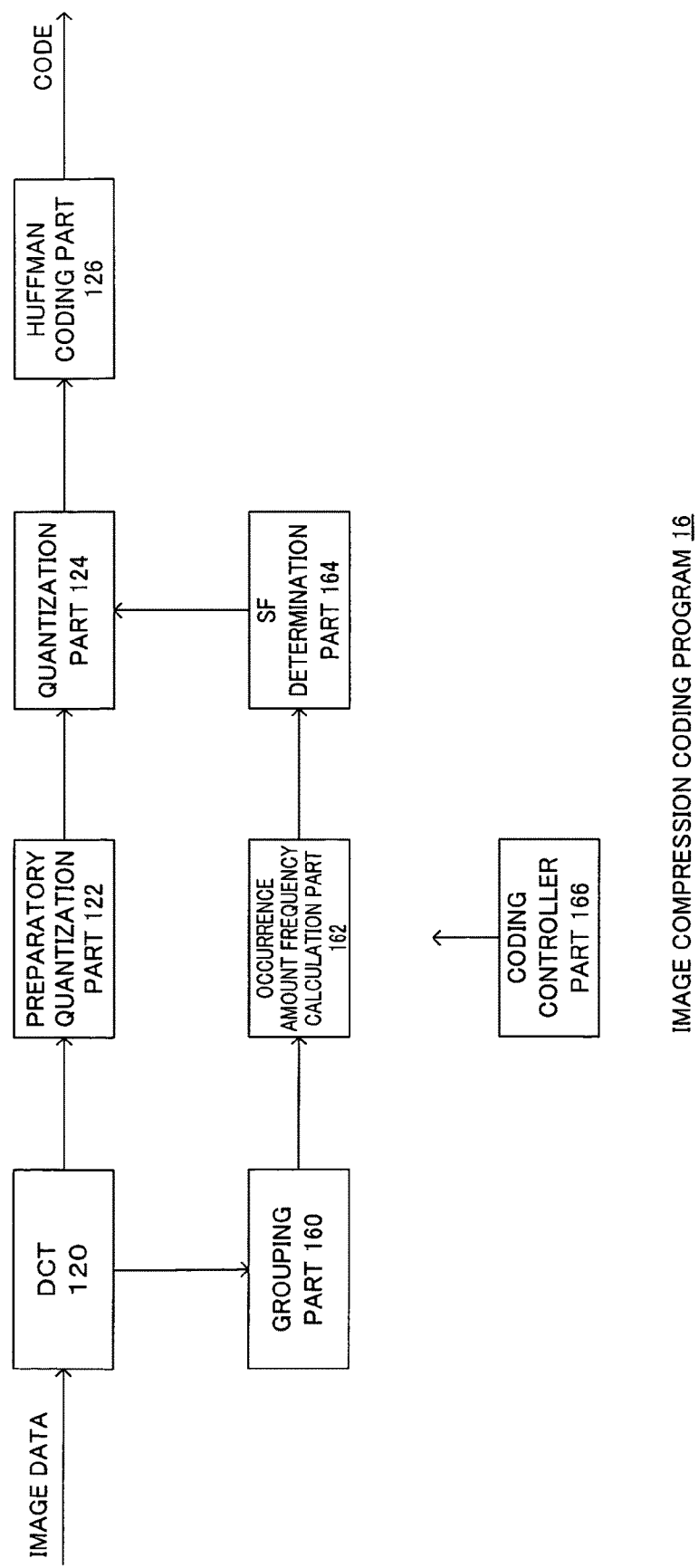
FIG. 5 is a block diagram showing a configuration of a second image compression coding program.

FIG. 5 is a block diagram showing a configuration of the second image compression coding program 16.

As shown in FIG. 5, the second image compression coding program 16 has a DCT part 120, a quantization part 124, a Huffman coding part 126 (FIG. 2), a preparatory quantization part 122, a grouping part 160, an occurrence amount frequency calculation part 162, a scaling factor determination part 164 and a coding controller 166.

The image compression coding program 16 optimizes the quantization coefficient Q with these constituent elements by using occurrence frequencies of the feature amounts obtained by DCT processing of image data and compression-encodes the image data.

In the image compression coding program 16, the coding controller 166 controls processing by the respective constituent elements of the image compression coding program 16.

As in the case of the feature amount integration part 142 of the first image compression coding program 14 shown in FIG. 4, the grouping part 160 receives, as feature amounts, the dynamic ranges of the DCT coefficients of the DCT coefficient group obtained from the respective plural pixel blocks, from the DCT part 120.

Further, the grouping part 160 performs grouping on the respective feature amounts into plural groups for classification of feature amounts respectively having values in predetermined ranges, and outputs the feature amounts to the occurrence amount frequency calculation part 162.

As in the case of the feature amount counting part 144 of the first image compression coding program 14 shown in FIG. 4, the occurrence amount frequency calculation part 162 counts the number of feature amounts divided in plural groups by the grouping part 160, generates a histogram indicating these numbers, and outputs the result of counting to the scaling factor determination part 164.

The scaling factor (SF) determination part 164 calculates a scaling factor SF used for optimization of the quantization coefficient Q using the histogram inputted from the occurrence amount frequency calculation part 162, and outputs a quantization coefficient SF×Q, optimized by multiplying an initial value of the quantization coefficient Q by the scaling factor, to the quantization part 124.

When preparatory quantization is performed in the image compression coding program 16, the preparatory quantization part 122 quantizes the DCT coefficients included in the DCT coefficient group inputted from the DCT part 120 with the initial value (Q/50) of the quantization coefficient Q obtained by multiplying a minimum value of the scaling factor SF, $SF_{min}$ (e.g., 1/50), and outputs the result of quantization to the quantization part 124.

Further, when preparatory quantization is not performed in the image compression coding program 16, the preparatory quantization part 122 outputs the DCT coefficients included in the DCT coefficient group inputted from the DCT part 120, without any processing, to the quantization part 124.

The quantization part 124 quantizes the quantization value inputted from the preparatory quantization part 122, with a quantization coefficient Q', inputted from the scaling factor determination part 164 and multiplied by the scaling factor (e.g., Q'=Q initial value×SF=Q initial value×n/50; n≧1), and outputs the result of quantization to the Huffman coding part 126.

Note that in the case of DCT coefficient quantization by the preparatory quantization part 122 and the quantization part 124 and the case of the quantization by only the quantization part 124, values (quantized values) obtained by these cases of quantization correspond with each other except calculation errors.

For example, when the DCT coefficients are quantized with scaling factor SF=50/50, quantization coefficient Q'=100 and the preparatory quantization part 122 performs quantization with a quantization coefficient obtained by multiplying the scaling factor SF=1/50 (i.e., 2), the quantization part 124 performs further quantization with a quantization coefficient multiplied by the scaling factor SF=25/50 (i.e., 50).

That is, since the DCT coefficients are quantized with the quantization coefficient 2 by the preparatory quantization part 122 and quantized with the quantization coefficient 50 by the quantization part 124, the quantized value corresponds with the value quantized with the quantization coefficient 100 by only the quantization part 124.

[Scaling Factor Regulation Method]

Hereinbelow, a method for regulating the scaling factor by the scaling factor determination part 164 will be described.

(1) Regulation Based on Non-Zero Coefficient Ratio:

When the respective DCT coefficients of the DCT coefficient group outputted from the DCT part 120 are quantized with the above-described quantization coefficient Q', the quantized value of a DCT coefficient less than the quantization coefficient Q' is 0, while the quantized values of other DCT coefficient are other than 0, i.e. (non-zero) values.

For example, the scaling factor determination part 164 counts the number of DCT coefficients having values equal to or greater than the quantization coefficient Q' among the DCT coefficients of the DCT coefficient group generated by the DCT part 120, thereby regulates the value of the scaling factor SF such that the ratio of the non-zero quantized values after the quantization attains sufficiently good image quality in image data obtained by decoding a code obtained by compression coding by the image compression coding program 16.

(2) Regulation Using Size of Scale of the Scaling Factor SF:

For example, as described with reference to (3) in FIG. 3, for example, in the scaling factor determination part 164 of the image compression coding program 16, in a case where the scaling factor SF is changed at an interval (scale) of 10/50 (=1/5), assuming that the initial value of the quantization coefficient is Q, the quantization coefficient Q' after the regulation is changed at an interval of Q/5.

For example, as the initial value of the quantization coefficient, Q=100 holds, as the scale of the quantization coefficient Q' is 20, the occurrence amount frequency calculation part 162 counts only the number of DCT coefficients having values within a range of 0 to 19 from the number of all the DCT coefficients.

The scaling factor determination part 164 can regulate the quantization coefficient Q' based on the above-described ratio of non-zero DCT coefficients without histogram interpolation, using the counted value by the occurrence amount frequency calculation part 162.

(3) Regulation Using Characteristics Shown (1) and (2) in FIG. 3:

For example, as described with reference to (1) in FIG. 3, in plural DCT coefficient groups, when values of the DCT coefficients in plural DCT coefficient groups are approximate to each other, the occurrence amount frequency calculation part 162 performs counting on the assumption that these DCT coefficient groups include the same DCT coefficients, and the scaling factor determination part 164 calculates the scaling factor SF using the counted value by the occurrence amount frequency calculation part 162.

Further, it may be arranged such that the scaling factor determination part 164 calculates the scaling factor SF while equally handling the respective DCT coefficients of the DCT coefficient groups obtained by the above-described counting by the occurrence amount frequency calculation part 162, or the scaling factor determination part 164 performs weighting and calculates the scaling factor SF.

FIG. 6 is an explanatory view of a method for allocating a value obtained by counting three DCT coefficient values included in plural (three) DCT coefficient groups, as one value, to the respective three DCT coefficient values.

That is, for example, as shown on the left side of FIG. 6, the occurrence amount frequency calculation part 162 performs counting on three DCT coefficient values A, B and C included in DCT coefficient groups of the respective pixel blocks, as one value, to obtain a value d(x). Then, upon allocation of the value obtained by counting the three DCT coefficient values A, B and C, the scaling factor determination part 164 equally allocates the counted value d(x)/3 to the respective values A, B and C.

Otherwise, for example, because of a general characteristic of an image that the image converted to frequency domains includes many low frequency components, as shown on the right side of FIG. 6, upon allocation of the value d(x) obtained by counting by the occurrence amount frequency calculation part 162 to the three DCT coefficient values A, B and C, the lowest frequency DCT coefficient among the values A, B and C can be most greatly weighted by the scaling factor determination part 164.

[Operation of Second Image Compression Coding Program 16]

FIGS. 7A to 7D are first to fourth block diagrams showing operations of the second image compression coding program 16 shown in FIG. 5.

Note that in FIGS. 7A to 7D, the coding controller 166 is omitted.

When image data is compression-encoded by JEPG coding, the scaling factor SF (quantization coefficient Q') is used in common in processing of all the pixel blocks included in image data for one image.

Figure 7A:
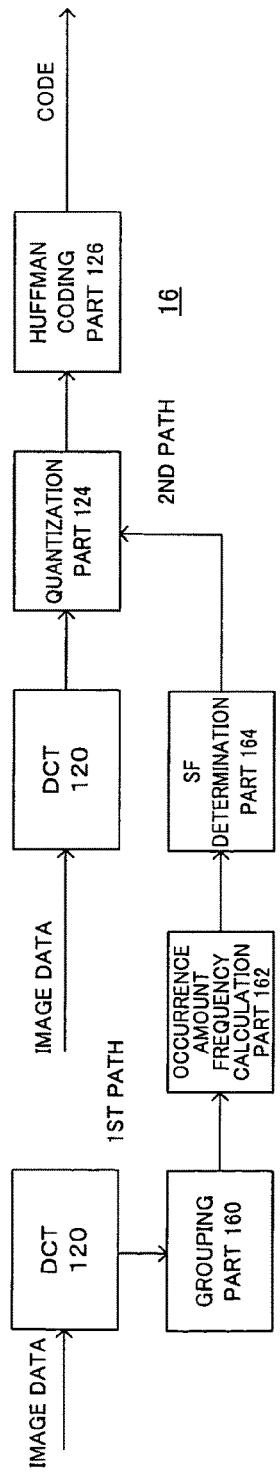
FIGS. 7A to 7D are first to fourth block diagrams showing operations of the second image compression coding program shown in FIG. 5.

Accordingly, as shown in FIG. 7A, the coding controller 166 (not shown in FIGS. 7A to 7D) controls the respective constituent elements of the image compression coding program 16 so as to compression-encode the image data with two processing paths.

[First Operation of Image Compression Coding Program 16]

First, a first operation of the image compression coding program 16 will be described.

As shown in FIG. 7A, in the first path, the coding controller 166 controls the DCT part 120, the grouping part 160, the occurrence amount frequency calculation part 162 and the scaling factor determination part 164 to process all the image data for one image and calculate the scaling factor SF (quantization coefficient Q') used for quantization of the image data for one image.

Next, in the second path, the coding controller 166 controls the DCT part 120, the quantization part 124 and the Huffman coding part 126 to perform image compression processing using the scaling factor SF (quantization coefficient Q') calculated in the first path.

[Second Operation of Image Compression Coding Program 16]

Next, a second operation of the image compression coding program 16 will be described.

Figure 7B:
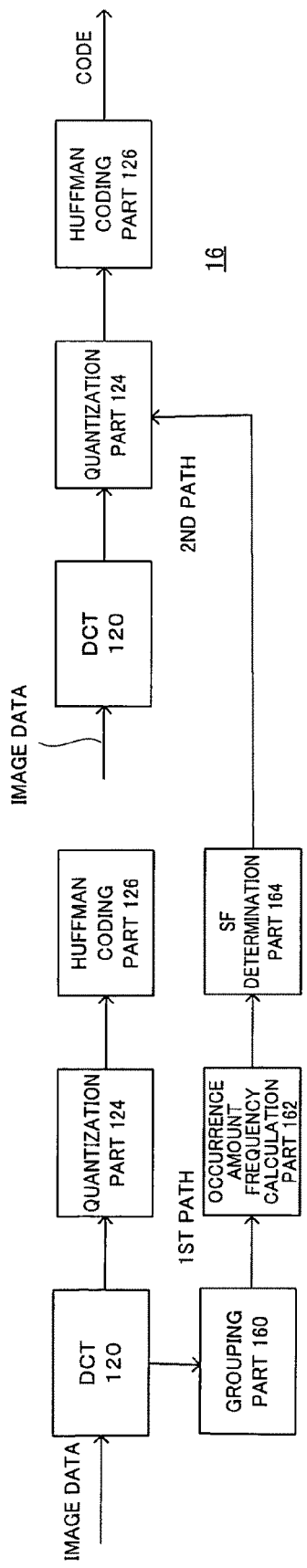

First, as shown in FIG. 7B, in the first path, the coding controller 166 controls the DCT part 120, the quantization part 124, the Huffman coding part 126, the grouping part 160, the occurrence amount frequency calculation part 162 and the scaling factor determination part 164 to process all the image data for one image, calculate the scaling factor SF (quantization coefficient Q') used for quantization of the image data for one image, and generate JPEG codes.

Further, the coding controller 166 measures the amount of the JEPG code data generated in the first path (code amount estimation). When the amount is within a predetermined value range, the coding controller 166 controls the DCT part 120, the quantization part 124 and the Huffman coding part 126 to perform compression coding using the scaling factor SF (quantization coefficient Q') used for generation of the JPEG codes.

Otherwise, the coding controller 166 measures the amount of JEPG code data generated in the first path, and when the amount is not within the predetermined value range, controls the grouping part 160, the occurrence amount frequency calculation part 162 and the scaling factor determination part 164 with changed settings, to regulate the scaling factor SF (quantization coefficient Q') until the amount of generated JPEG codes becomes within the predetermined value range.

Further, the coding controller 166 controls the DCT part 120, the quantization part 124 and the feature amount calculation part 128 to perform compression coding using the generated scaling factor SF (quantization coefficient Q') regulated in the first path.

[Third Operation of Image Compression Coding Program 16]

Next, a third operation of the image compression coding program 16 will be described.

Figure 7C:
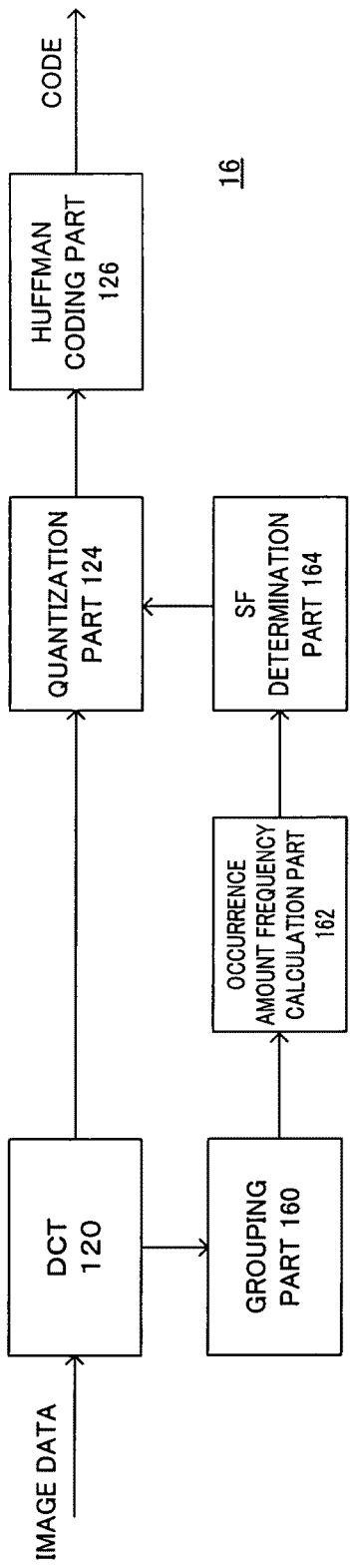

First, as shown in FIG. 7C, in the first path, the coding controller 166 controls the DCT part 120, the quantization part 124, the Huffman coding part 126, the grouping part 160, the occurrence amount frequency calculation part 162 and the scaling factor determination part 164 to generate and store all the DCT coefficient groups from image data for one image, and calculate the scaling factor SF (quantization coefficient Q') from these DCT coefficient groups.

Further, the coding controller 166 compression-encodes all the stored DCT coefficient groups obtained from the image data for one image and generates JPEG codes.

[Fourth Operation of Image Compression Coding Program 16]

Next, a fourth operation of the image compression coding program 16 will be described.

Figure 7D:
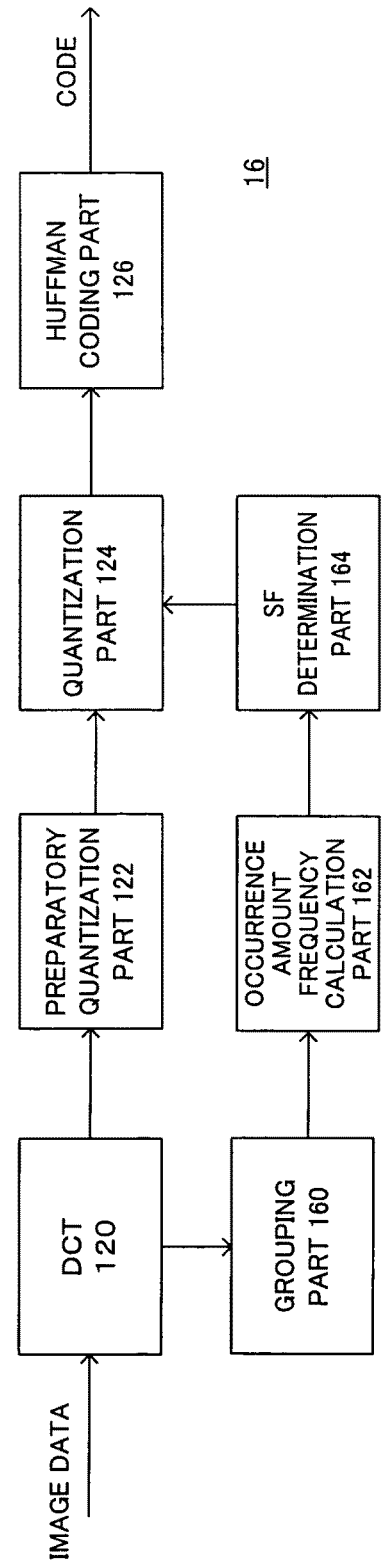

First, as shown in FIG. 7D, in the first path, the coding controller 166 controls the DCT part 120, the preparatory quantization part 122, the quantization part 124, the Huffman coding part 126, the grouping part 160, the occurrence amount frequency calculation part 162 and the scaling factor determination part 164 to generate all the DCT coefficient groups from image data for one image, and perform preparatory quantization by the preparatory quantization part 122 and store the result of quantization.

On the other hand, the scaling factor determination part 164 calculates the scaling factor SF (quantization coefficient Q') from these generated DCT coefficient groups.

Further, the coding controller 166 controls the DCT part 120, the quantization part 124 and the Huffman coding part 126 to compression-encode all the preparatory-quantized and stored DCT coefficient groups obtained from the image data for one image and generate JPEG codes.

[Modification of Operation of Image Compression Coding Program 16]

Note that, for example, in the above-described operation described with reference to FIG. 7B, even when the scaling factor SF (quantization coefficient Q') obtained in the first path is used, JPEG codes within a target range cannot always be obtained in the second path due to coding errors.

In consideration of such case, in the operation shown in FIG. 7B, a modification can be made to calculate the scaling factor SF (quantization coefficient Q') again in the second path and use the calculated scaling factor for generation of JPEG codes.

Further, in the operation described with reference to FIG. 7B, since the scaling factor SF (quantization coefficient Q') can be guessed in the processing in the first path, it may be arranged such that in processing in the second path, the grouping by the grouping part 160 and the weighting on the frequency components of the respective DCT coefficient groups by the scaling factor determination part 164 are regulated, and JPEG codes in the data amount within the target range are obtained by the processing in the first path and the processing in the second path.

Otherwise, it may be arranged such that in the processing in the first path, the scaling factor SF (quantization coefficient Q') is previously guessed, and when JEPG codes in the data amount within the target range cannot be obtained in the compression coding in the processing in the second path, processing in a third path is further performed, and in the processing in the third path, the interval (scale) of the scaling factor SF is increased or reduced and compression coding is performed.

[Third image compression coding program 18]

Hereinbelow, a third image compression coding program 18 will be described.

FIG. 8 is a block diagram showing a construction of the third image compression coding program 18.

Figure 9A:
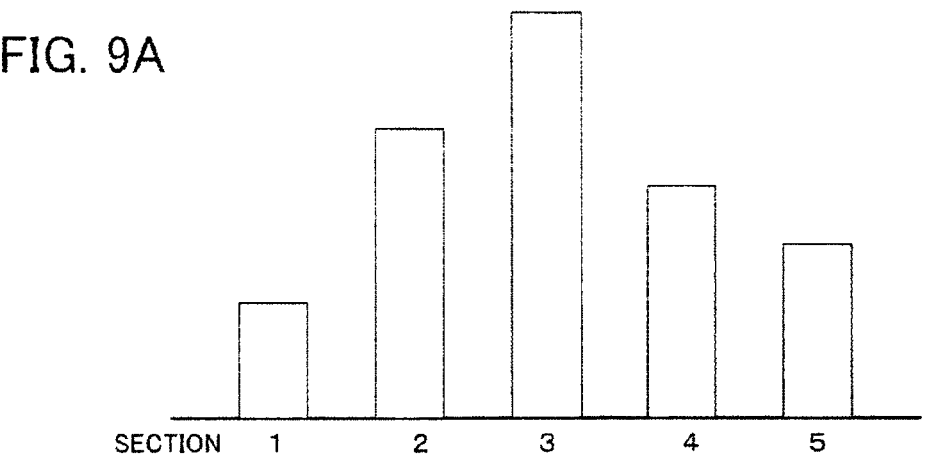
FIGS. 9A to 9C are graphs showing processing by a compression processing part shown in FIG. 8.
Figure 9B:
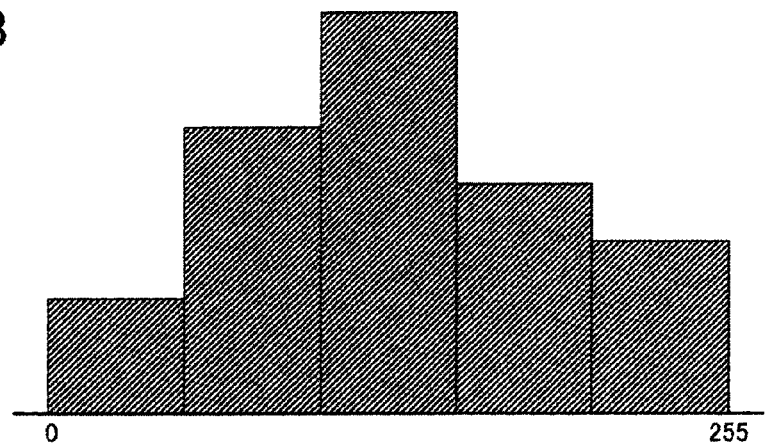
Figure 9C:
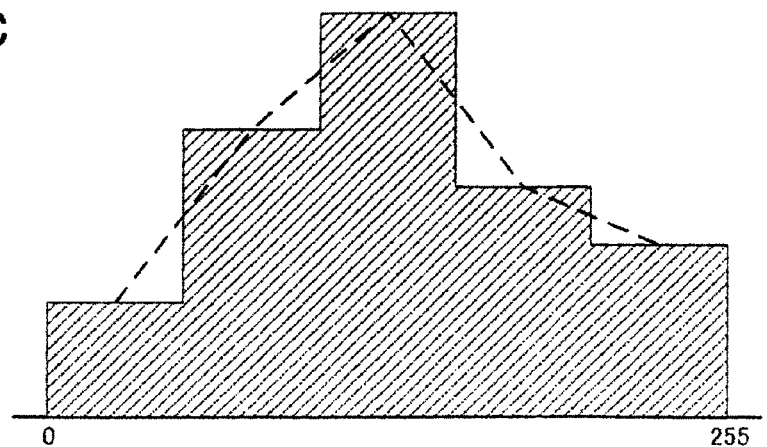

FIGS. 9A to 9C are graphs showing processing by the compression processing part 140 shown in FIG. 8.

As shown in FIG. 8, the third image compression coding program 18 has a blocking part 180, a dynamic range (DR) calculation part 182, a threshold value determination part

184, a color subtraction part 186, a predictive coding part 188, a grouping part 160, an occurrence amount frequency calculation part 162, a feature amount integration part 142 and a coding controller 170.

The image compression coding program 18 obtains respective dynamic ranges of pixel blocks included in image data with these constituent elements, reduces the number of color data pieces (RGB data pieces or the like) of a low-dynamic pixel block, and performs predictive compression coding without reducing the number of color data pieces of a high-dynamic pixel block.

In the image compression coding program 18, the coding controller 170 controls processing operations of the respective constituent elements of the image compression coding program 18.

The blocking part 180 decomposes inputted image data into pixel blocks, and outputs the pixel blocks to the DR calculation part 182 and the color subtraction part 186.

The DR calculation part 182 calculates the ranges of respective pixel values (dynamic ranges) of the pixel block inputted from the DR calculation part 182, and outputs the ranges to the grouping part 160 and the color subtraction part 186.

As shown in FIG. 9A, the grouping part 160 classifies the values of the dynamic ranges in the respective continuous pixel blocks in a predetermined section [a, b], e.g., [0, 255], inputted from the DR calculation part 182, into e.g. five groups, and generates a histogram.

The occurrence amount frequency calculation part 162 performs counting on the values of the dynamic ranges of the pixel blocks, included in the predetermined section [a, b] inputted from the grouping part 160 and classified in the respective groups.

The occurrence amount frequency calculation part 162 performs interpolation on occurrence frequencies of the values of the dynamic ranges existing between the representative values of the histogram, on the assumption that the counted values of the respective groups are equally divided between the representative values of the respective groups as shown in FIG. 9B, or on the assumption that the values of the dynamic ranges exist continuously between the representative values of the respective groups as shown in FIG. 9C.

Note that as shown in FIG. 9B, it can be considered that the assumption that the counted values of the respective groups are equally divided between the representative values of the respective groups is appropriate from an empirical rule that in image data, pixel values included in pixel blocks in close positions are mutually close to each other.

The threshold value determination part 184 processes the histogram generated by the occurrence amount frequency calculation part 162, determines a threshold value for the dynamic ranges, and outputs the threshold value to the color subtraction part 186.

More particularly, for example, based on the distribution of the number of image blocks by predetermined dynamic range, the threshold value determination part 184 determines a dynamic range corresponding to a predetermined target number of blocks as a threshold value.

The color subtraction part 186 performs subtractive color processing on the image blocks inputted from the blocking part 180 based on the dynamic ranges inputted from the DR calculation part 182 and the threshold value inputted from the threshold value determination part 184.

More particularly, for example, when the dynamic range inputted from the DR calculation part 182 is less than the threshold value inputted from the threshold value determination part 184, the color subtraction part 186 substitutes all the pixel values of the image block with a mean pixel value in the pixel block, and obtains a monochromatic image.

Further, for example, when the dynamic range is greater than the threshold value, the color subtraction part 186 substitutes all the pixel values in the pixel block with one of two color values, and obtains a dichromatic image.

The dichromatic processing is performed by e.g., with a mean value between a maximum value and a minimum value within an image block as a threshold value, classifying pixel values in the image block into groups equal to or greater than the threshold value and groups less than the threshold value, and substituting pixel values belonging to each group with a mean value of the pixel values belonging to the group.

Note that the subtractive color processing in the image block when the dynamic range is equal to or greater than the threshold value may be performed to obtain an image in three or more colors.

Figure 10:
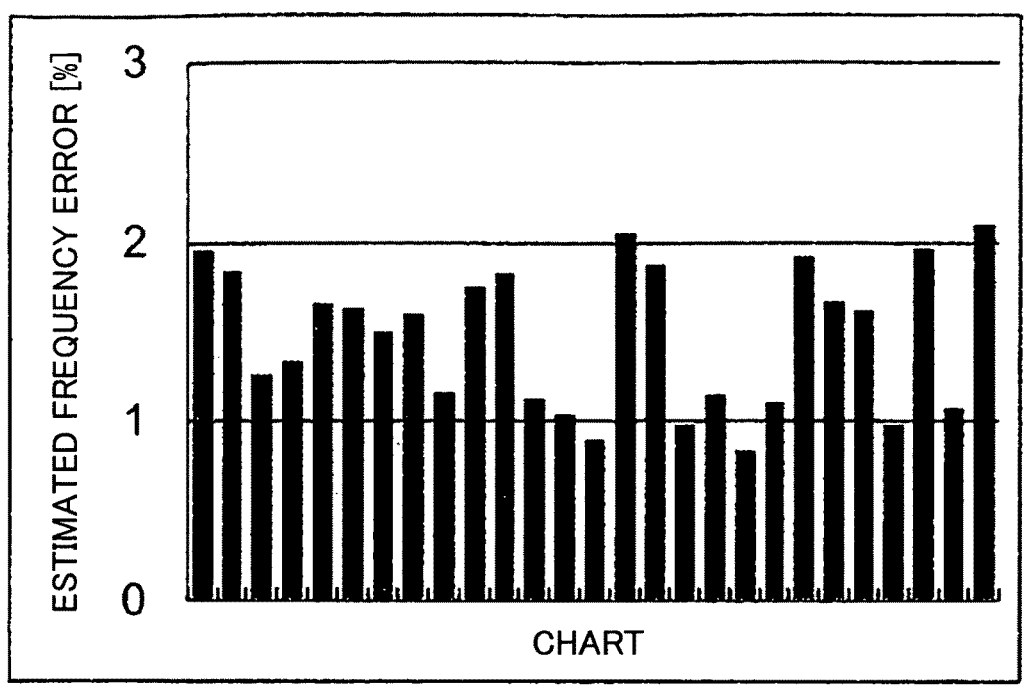
FIG. 10 is a histogram showing errors of estimated dynamic range values in respective pixel blocks obtained by a grouping part and an occurrence amount frequency calculation part in the third image compression coding program shown in FIG. 8.

FIG. 10 is a histogram showing errors of estimated values of the dynamic ranges in respective pixel blocks obtained by the grouping part 160 and the occurrence amount frequency calculation part 162 in the third image compression coding program 16 shown in FIG. 8.

As shown in FIG. 10, in the image compression coding program 16, since almost all the errors of estimated values of dynamic ranges in the respective pixel blocks are equal to or lower than 2%, the threshold value determination part 184 generates an approximately accurate threshold value based on the estimation by the occurrence amount frequency calculation part 162.

[Entire Operation of Third Image Compression Coding Program 18]

Hereinbelow, an entire operation of the image compression coding program 18 will be described.

The coding controller 170 controls processing operations of the respective constituent elements of the image compression coding program 18.

The blocking part 180 decomposes inputted image data into pixel blocks, and the DR calculation part 182 calculates the ranges of pixel values (dynamic ranges) in the respective pixel blocks inputted from the DR calculation part 182.

The grouping part 160 generates a histogram of the values of the dynamic ranges of the respective pixel blocks included in the predetermined section [a, b].

The occurrence amount frequency calculation part 162 performs counting on the values of the dynamic ranges in the pixel blocks included in the section [a, b].

The occurrence amount frequency calculation part 162 performs interpolation on the occurrence frequencies of the values of the dynamic ranges exist between the representative values of the histogram in accordance with necessity.

The threshold value determination part 184 processes the histogram generated by the occurrence amount frequency calculation part 162 and obtains a threshold value for subtractive color processing.

The color subtraction part 186 performs subtractive color processing on the pixels in the image block in accordance with the relation between the image block and the threshold value.

Note that the image compression coding program 18 performs code amount control in fewer times than in the conventional art, and accordingly, the program can be appropriately realized with hardware.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image coding apparatus comprising:
a processor; and
a memory storing instructions, which when executed cause the processor to act as:
a transformation unit that is configured to transform spatial domain image data having a plurality of pixels, by a pixel block including a plurality of pixels as a unit, into a plurality of coefficient groups each including a plurality of frequency domain coefficients;
a grouping unit that is configured to classify the plurality of coefficient groups into a plurality of groups for classification of values in these coefficient groups;
a quantization coefficient calculation unit that is configured to calculate a quantization coefficient used for quantizing a plurality of coefficients included in the respective plurality of coefficient groups based on the number of coefficient groups classified in the plurality of groups and the values of the coefficient groups classified in the plurality of groups;
a quantization unit that is configured configured to quantize the respective plurality of coefficients included in the respective plurality of coefficient groups obtained by the transformation by using the calculated quantization coefficient; and
a coding unit that is configured to encode the plurality of coefficients included in the plurality of quantized coefficient groups to generate codes.

2. The image coding apparatus according to claim 1, wherein the values of the coefficient groups used for classification by the grouping unit and classified in the plurality of groups are correlated to a code amount of the codes generated by the coding unit.

3. The image coding apparatus according to claim 1, wherein the values of the coefficient groups used for classification by the grouping unit and classified in the plurality of groups are numerical values indicating distribution of the plurality of coefficients included in the plurality of coefficient groups.

4. The image coding apparatus according to claim 1, wherein the coding unit performs predictive coding and generates codes, and the values of the coefficient groups used for classification by the grouping unit and classified in the plurality of groups are numerical values indicating ranges of pixel values included in the pixel block, or ranges of the plurality of coefficients included in the plurality of coefficient groups.

5. The image coding apparatus according to claim 4, wherein the image data includes a plurality of colors, the apparatus further comprising:
a threshold value generation unit that generates a threshold value indicating a reference for processing to subtract color data indicating the plurality of colors based on the ranges of the pixel values included in the pixel block or the numerical values indicating the ranges of the plurality of coefficients included in the plurality of coefficient group of the image data; and
a color subtraction unit that performs processing to subtract color data, included in a respective plurality of the pixel blocks and indicating the plurality of colors, in correspondence with relation between the numerical values indicating the ranges of the coefficients obtained from the respective plurality of the pixel blocks by the transformation unit and the threshold value, and the coding unit performs predictive coding on image data processed by the color subtraction unit.

6. The image coding apparatus according to claim 1, wherein when the quantized coefficients are less than the quantization coefficient, the quantized coefficients are predetermined numerical values, and the values of the coefficient groups used for classification by the grouping unit and classified in the plurality of groups are values to set the number of quantization coefficients to have a predetermined numerical value within a predetermined range.

7. The image coding apparatus according to claim 1, wherein the quantization coefficient calculation unit calculates values of discrete quantization coefficients, and the grouping unit classifies the coefficient groups to be quantized to the same value with the discrete quantization coefficients into the same group.

8. The image coding apparatus according to claim 1, wherein the grouping unit classifies the plurality of coefficient groups into a plurality of groups for classification of some of values in these coefficient groups, and the number of coefficient groups included in a group for classification of others than the some of the values in these coefficient groups is interpolated based on the number of coefficient groups included in the group for classification of the some of the values in these coefficient groups.

9. The image coding apparatus according to claim 8, wherein the grouping unit performs weighting on the plurality of coefficient groups in a plurality of groups for classification of the some of the values in the coefficient groups, and the number of the coefficient groups included in other groups for classification of others than the some of the values in these coefficient groups are interpolated based on the number of coefficient groups included in the group for classification of the some of the values in the weighted coefficient groups.

10. The image coding apparatus according to claim 1, wherein the transformation unit transforms the image data into the plurality of coefficient groups by the discrete Fourier transform.

11. The image coding apparatus according to claim 1, wherein the transformation unit transforms the image data into the plurality of coefficient groups by the discrete cosine transform.

12. A non-transitory computer readable medium storing a program causing a computer to execute a process for image coding, the process comprising:
transforming spatial domain image data having a plurality of pixels, by a pixel block including a plurality of pixels as a unit, into a plurality coefficient groups each including a plurality of coefficients in frequency domains;
classifying the plurality of coefficient groups into a plurality of groups for classification of values in these coefficient groups;
calculating a quantization coefficient used-for quantizing a plurality of coefficients included in the respective plurality of coefficient groups based on the number of coefficient groups classified in the plurality of groups and the values of the coefficient groups classified in the plurality of groups;
quantizing the respective plurality of coefficients included in the respective plurality of coefficient groups obtained by the transformation by using the calculated quantization coefficient; and encoding the plurality of coefficients included in the plurality of quantized coefficient groups to generate codes.

13. An image coding method comprising:

transforming spatial domain image data having a plurality of pixels, by a pixel block including a plurality of pixels as a unit, into a plurality of coefficient groups each including a plurality of coefficients in frequency domains;

classifying the plurality of coefficient groups into a plurality of groups for classification of values in these coefficient groups;

calculating a quantization coefficient used for quantizing a plurality of coefficients included in the respective plurality of coefficient groups based on the number of coefficient groups classified in the plurality of groups and the values of the coefficient groups classified in the plurality of groups;

quantizing the respective plurality of coefficients included in the respective plurality of coefficient groups obtained by the transformation by using the calculated quantization coefficient; and encoding the plurality of coefficients included in the plurality of quantized coefficient groups to generate codes.

14. The image coding apparatus according to claim 1, wherein a plurality of histograms of the plurality of coefficient groups are integrated into one histogram.

15. The non-transitory computer readable medium according to claim 12, wherein a plurality of histograms of the plurality of coefficient groups are integrated into one histogram.

16. The image coding method according to claim 13, wherein a plurality of histograms of the plurality of coefficient groups are integrated into one histogram.

17. The image coding apparatus according to claim 14, wherein when a plurality of coefficient groups obtained from one pixel group are substantially the same as a plurality of coefficient groups obtained from another pixel group, the plurality of coefficient groups from the one pixel group and the another pixel group are quantized using the same quantization coefficient, and when histograms of two of the plurality of coefficient groups, that are positioned symmetrically with a diagonal component therebetween, have substantially the same characteristics, buffering is performed only on one of the two of the plurality of coefficients.

18. The non-transitory computer readable medium according to claim 15, wherein when a plurality of coefficient groups obtained from one pixel group are substantially the same as a plurality of coefficient groups obtained from another pixel group, the plurality of coefficient groups from the one pixel group and the another pixel group are quantized using the same quantization coefficient, and when histograms of two of the plurality of coefficient groups, that are positioned symmetrically with a diagonal component therebetween, have substantially the same characteristics, buffering is performed only on one of the two of the plurality of coefficients.

19. The image coding method according to claim 16, wherein when a plurality of coefficient groups obtained from one pixel group are substantially the same as a plurality of coefficient groups obtained from another pixel group, the plurality of coefficient groups from the one pixel group and the another pixel group are quantized using the same quantization coefficient, and when histograms of two of the plurality of coefficient groups, that are positioned symmetrically with a diagonal component therebetween, have substantially the same characteristics, buffering is performed only on one of the two of the plurality of coefficients.

* * * * *